Dec. 13, 1938.   F. G. HEUMANN   2,140,288
GRASS SHEARS
Filed Aug. 19, 1937
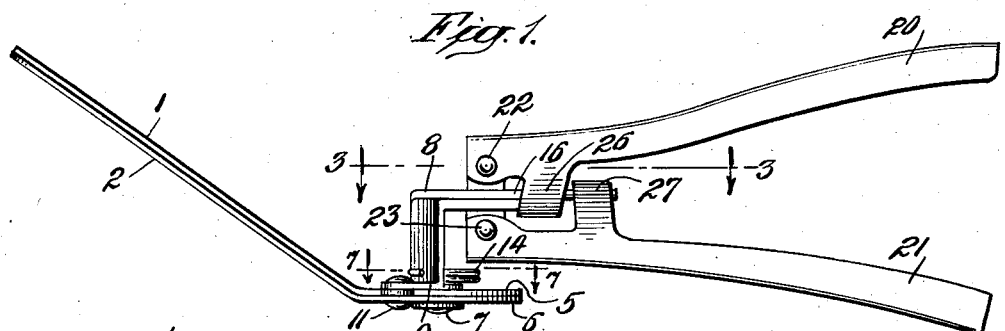
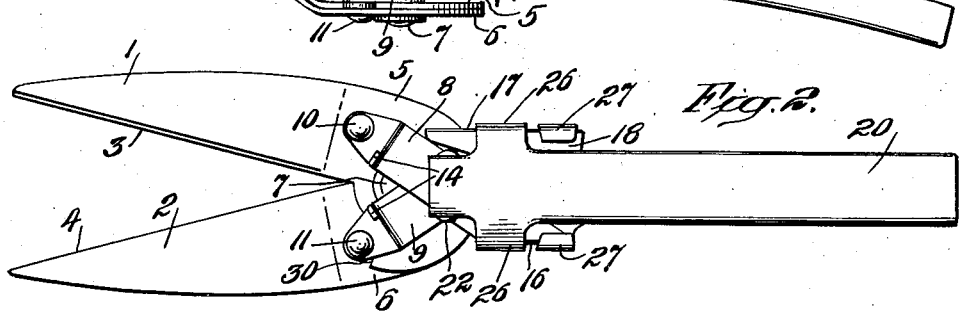
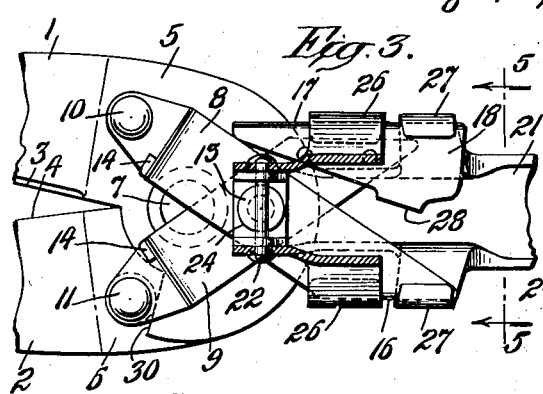
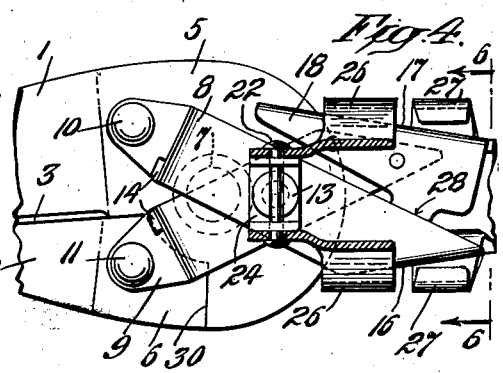
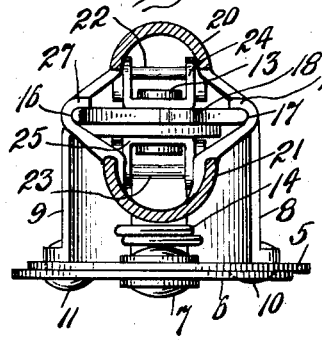
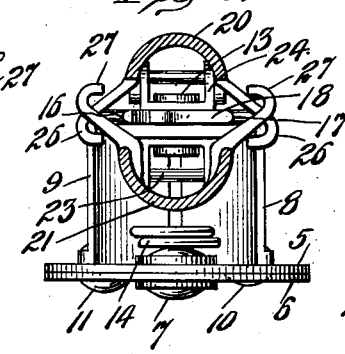
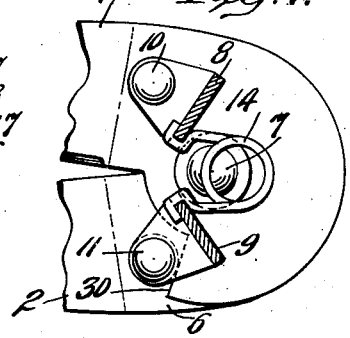
INVENTOR
FERDINAND G. HEUMANN
BY D. Malcolm
ATTORNEY Patented Dec. 13, 1938

2,140,288

UNITED STATES PATENT OFFICE 2,140,288

GRASS SHEARS

Ferdinand G. Heumann, Great Neck, N. Y.

Application August 19, 1937, Serial No. 159,863

7 Claims. (Cl. 30—257)

This invention relates to hand shears for cutting grass and the like and has for its object to provide an improved shearing device of this type in which the actuating handles are arranged at right angles to the plane of the cutting blades.

Another object of the invention is to provide a grass shears of the above type, in which all of the operating mechanisms and connections, including the pivotal connection between the two cutting blades, are oblique to the plane of the blades and are thereby prevented from contacting with and picking up particles of grass, weeds and the like which are frequently caught in the bearings of ordinary shears and render them difficult to operate.

Attempts have been made to construct grass shears with actuating handles arranged at right angles to the cutting blades, it being recognized that shears of this type permit the hand, wrist and arm to be held in a natural unstrained position during the cutting operation, but so far as I am aware no practical shears of this type are available on the market today. The principal reason for the failure of such shears in the past has been the complex mechanisms required to translate the vertical movement of the actuating handles into horizontal movement of the blades, which not only made the cost of the shears prohibitive but also made them very difficult and tiresome to operate especially by a woman or other person with a weak hand or wrist. The difficulty of operation was also greatly increased by fouling due to grass and foreign matter being caught in the bearings of the blades which would invariably happen in previous devices of this type.

My improved shears embody all the advantages of a natural vertical hand grip without any of the disadvantages found in previous devices of this type. In its preferred form my device includes a pair of substantially flat companion blades provided with the usual cutting edges and having rearwardly extending flat bearing surfaces which are pivoted together and are bent upwardly at a substantial angle to the flat faces of the blades so that these bearing surfaces and all other actuating parts between the blades and the handles are held clear of the ground and out of contact with the grass when the blades are in normal cutting position. The novel construction of the operating mechanism, hereinafter described, enables the shears to be operated without difficulty or excessive fatigue and also greatly simplifies the cleaning and oiling of the parts when required.

These and other features and advantages of the invention will be described in connection with the accompanying drawing, in which:

Fig. 1 is a side elevation of my improved shears;

Fig. 2 is a top plan view of the shears with the cutting blades in open position;

Fig. 3 is a broken horizontal section taken on line 3—3 of Fig. 1;

Fig. 4 is a view similar to Fig. 3 but with the cutting blades closed;

Fig. 5 is a transverse section taken on line 5—5 of Fig. 3;

Fig. 6 is a transverse section taken on line 6—6 of Fig. 4; and

Fig. 7 is a horizontal section taken on line 7—7 of Fig. 1.

The drawing shows the shears as embodying a pair of substantially flat companion blades 1 and 2 having cutting edges 3 and 4 and rearwardly extending flat surfaces 5 and 6 which are bent upwardly at an angle of about 135° with the flat faces of the blades as illustrated in Fig. 1. These oblique flat surfaces 5 and 6 are superimposed and pivoted together as by means of a rivet 7 to form cooperating bearing surfaces for the cutting blades.

The actuating mechanism for the cutting blades comprises a pair of right-angled arms 8 and 9 which are secured as by rivets 10 and 11 to the offset faces 5 and 6 of the respective blades 1 and 2, the upper portions of these arms being crossed and pivoted together as by means of a rivet 13. A compression spring 14, having its ends sprung over the adjacent upstanding edges of arms 8 and 9 as shown in Fig. 7, tends to hold the cutting blades in the open position shown in Figs. 2 and 3.

The upper portions of the actuating arms 8 and 9, which are crossed at the pivot point 13, are preferably parallel to the oblique surfaces 5 and 6 of the cutting blades, and the outer edges 16 and 17 of these upper arm portions are formed so that they are substantially parallel to each other when the cutting blades are spread or open as in Figs. 2 and 3. In the form illustrated, the upper edge 17 of actuating arm 9 is formed by a separate plate or strip of metal 18 which is riveted to the upper portion of arm 9 and is in the same plane as the upper portion of arm 8, although it will be evident that the plate 18 may be made integral with the arm 9 if desired.

The actuating handles 20 and 21 of the shears are arranged in a plane perpendicular to the plane of the cutting blades 1 and 2 and are pivoted by rivets 22 and 23 to U-shaped bearings 24 and 25 which, in turn, are swivelled to the rivet 13 forming the pivot connection of the actuating arms 8 and 9 as best shown in Figs. 5 and 6 of the drawing. The handles 20 and 21 are channel-shaped and are provided adjacent their pivot points with projecting pairs of lugs 26 and 27, lugs 26 projecting downwardly from the upper handle 20 while lugs 27 project upwardly from the lower handle 21, and the ends of these lugs are turned over so as to receive the upper outer edges 16 and 17 of actuating arms 8 and 9 and thereby limit the opening movement of the cutting blades 1 and 2 as illustrated in the drawing.

The inner faces of the lugs 26 and 27 engaging the outer edges 16 and 17 of actuating arms 8 and 9 are so constructed that they slope inwardly toward their respective handles 20 and 21. Consequently, when the handles 20 and 21 are grasped by the hand and pressed together the sloping faces of lugs 26 and 27 ride over the outer edges 16 and 17 of arms 8 and 9, thus causing said arms to turn about their pivot 13 and closing the cutting blades 1 and 2 against the compression of spring 14 as illustrated in Fig. 4. The limit of the closing movement is reached when a stop 28 on the inner edge of plate 18 on arm 9 strikes against the adjacent inner edge of arm 8 as shown in Fig. 4, at which time the cutting blades of the shears are closed. As soon as the pressure on handles 20 and 21 is released the spring 14 returns the parts to the initial position in which the cutting blades are open as shown in Figs. 2 and 3. The opening movement of the cutting blades is limited by the engagement of lugs 26 and 27 with the actuating arm edges 16 and 17, and also by the engagement of the edges 30 of blade extensions 5 and 6 with the respective rivets 10 and 11 as illustrated in Figs. 2, 3 and 7.

It will be evident that my shears are extremely simple in construction and may be operated without excessive strain even by a person with little strength because of the small amount of power required to move the parts against the compression of the spring 14, and also because the mechanism which translates the vertical movement of the handles into the horizontal blade movement permits the handles to be mounted so close together that they may easily be spanned by a small hand. In using the shears the hand, wrist and arm are held in a natural unstrained position and the flat cutting blades are held close to the grass or ground while the bearing point 7 and all other parts of the actuating mechanism are held clear of the ground and out of contact with the grass so that fouling due to grass and foreign matter being caught in the bearings is effectively prevented.

When desired, the cutting blades may be held closed so as to permit the handles 20 and 21 to be swivelled about their bearings 23 and 24 thus opening the handles and exposing the bearings 7, 23, 24 and associated parts for removal of dust or for oiling.

It will be evident that various changes may be made in the details of construction herein shown and described without departing from the scope and spirit of my invention which is to be limited only by the appended claims when interpreted in view of the prior art.

The invention claimed is:

1. Shears comprising a pair of substantially flat cutting blades having rearwardly extending bearing surfaces oblique to the plane of said blades and pivoted together so that said bearing surfaces and pivot are held clear of the object to be cut when the blades are in normal cutting position, actuating arms secured to the respective bearing surfaces of said blades and having their outer portions crossed and pivoted together, a pair of actuating handles carried by said shears in a plane substantially perpendicular to the plane of said blades and disposed longitudinally of said blades, each of said handles being compressible with respect to the other, and means carried by said handles and cooperating with the outer portions of said actuating arms for moving said arms about their pivot to actuate said blades upon compression of said handles.

2. Shears comprising a pair of substantially flat cutting blades having rearwardly extending bearing surfaces oblique to the plane of said blades and pivoted together so that said bearing surfaces and pivot are held clear of the object to be cut when the blades are in normal cutting position, movable actuating handles carried by said shears in a plane substantially perpendicular to the plane of said blades and disposed longitudinally of said blades, and means actuated by the combined movement of said handles for actuating said blades.

3. Shears comprising a pair of substantially flat cutting blades having rearwardly extending bearing surfaces oblique to the plane of said blades and pivoted together so that said bearing surfaces and pivot are held clear of the object to be cut when the blades are in normal cutting position, a spring acting on said blades to hold same in open position, a pair of actuating handles pivoted on said shears in a plane substantially perpendicular to the plane of said blades and disposed longitudinally of said blades, each of said handles being compressible with respect to the other and means actuated by the compression of said handles for closing said blades against the action of said spring.

4. Shears comprising a pair of substantially flat cutting blades having rearwardly extending bearing surfaces oblique to the plane of said blades and pivoted together so that said bearing surfaces and pivot are held clear of the object to be cut when the blades are in normal cutting position, actuating arms secured to the respective bearing surfaces of said blades and having their outer portions crossed and pivoted together, a pair of compressible actuating handles carried by said shears in a plane substantially perpendicular to the plane of said blades, and lugs projecting from said handles into sliding engagement with the outer edges of said actuating arms, said lugs sloping inwardly toward their respective handles whereby to ride over the outer edges of said arms to actuate said arms and said blades upon compressing said handles.

5. Shears comprising a pair of substantially flat cutting blades having rearwardly extending bearing surfaces oblique to the plane of said blades and pivoted together so that said bearing surfaces and pivot are held clear of the object to be cut when the blades are in normal cutting position, angular actuating arms secured to the respective bearing surfaces of said blades and having their outer portions crossed and pivoted together, a compression spring acting on said arms in a direction to hold said blades in open position, a pair of compressible actuating handles carried by said shears in a plane substantially perpendicular to the plane of said blades, and lugs projecting from said handles and slidably engaging the outer edges of said actuating arms, said lugs sloping inwardly toward their respective handles whereby to ride over the outer edges of said arms to actuate said arms and said blades against the action of said spring upon compressing said handles.

6. Shears comprising a pair of substantially flat cutting blades having rearwardly extending bearing surfaces oblique to the plane of said blades and pivoted together so that said bearing surfaces and pivot are held clear of the object to be cut when the blades are in normal cutting position, angular actuating arms secured to the respective bearing surfaces of said blades and having their outer portions crossed and pivoted together, a pair of compressible actuating handles swivelled to the pivot of said actuating arms and pivoted to move in a plane substantially perpendicular to the plane of said blades, and lugs carried by said handles in sliding engagement with the outer edges of said actuating arms and having inturned edges holding said handles in engagement with said arms so as to limit the spreading of said handles, the surfaces of said lugs in engagement with said arms sloping inwardly toward their respective handles whereby to ride over the outer edges of said arms to move said arms about their pivot and thereby close said blade upon compression of said handles.

7. Shears comprising a pair of substantially flat cutting blades having rearwardly extending bearing surfaces pivoted together, movable actuating handles carried by said shears in a plane substantially perpendicular to the plane of said blades and disposed longitudinally of said blades, and means actuated by the combined movement of said handles for actuating said blades.

FERDINAND G. HEUMANN.